Nov. 11, 1930.  J. F. SHELTON  1,780,985
SEED PAN
Filed April 3, 1929
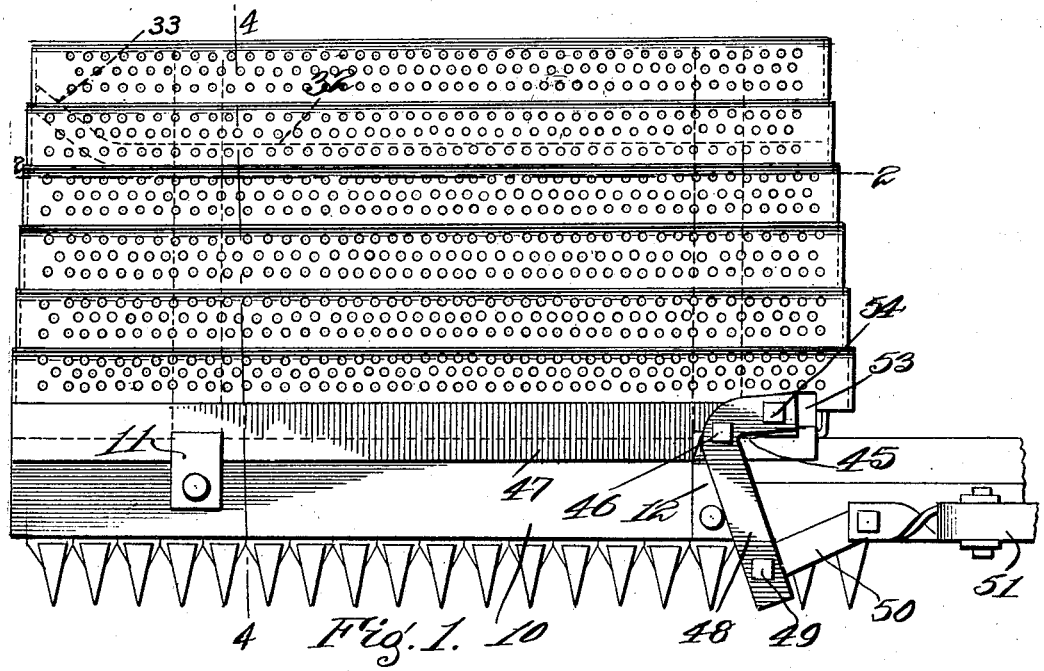
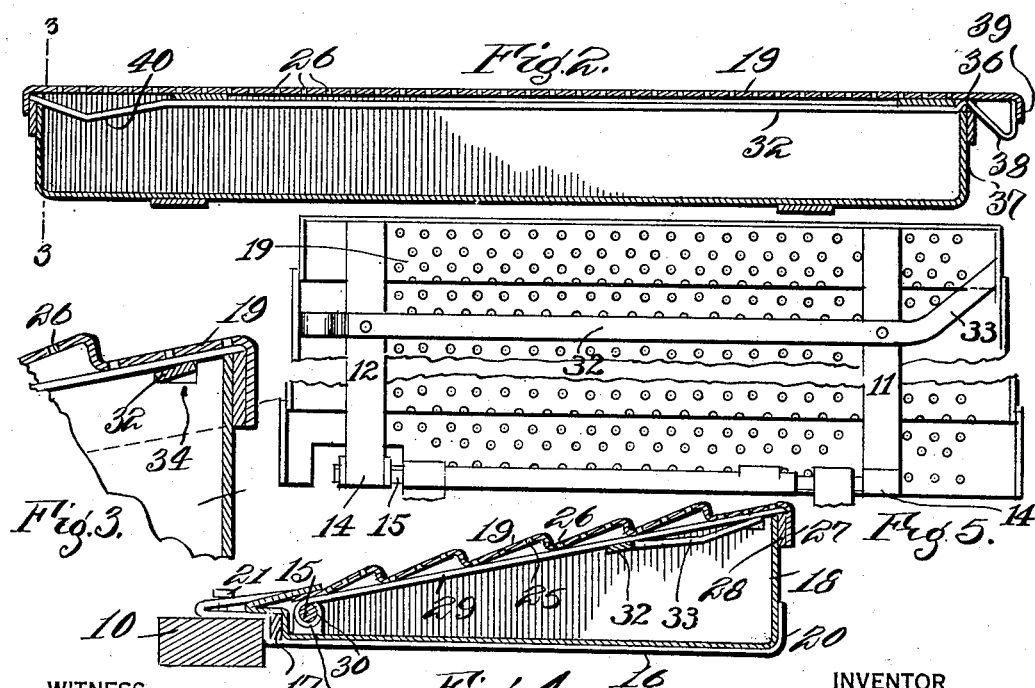
WITNESS
INVENTOR
Jack F. Shelton.
BY
ATTORNEY Patented Nov. 11, 1930

1,780,985

UNITED STATES PATENT OFFICE

JACK F. SHELTON, OF MEMPHIS, TENNESSEE

SEED PAN

Application filed April 3, 1929. Serial No. 352,216.

This invention relates to a threshing and mowing machine.

An object of the invention is the provision of a device in the shape of a seed pan and an oscillating perforated plate movable over the pan and connected to a moving part of the threshing machine for causing oscillation of the plate, said plate being stepped in order to provide for the discharge of the straw or hay from the plate.

Another object of the invention is the provision of an attachment for a threshing machine in which a perforated plate is slidably mounted upon a seed pan and which plate receives the hay or straw which is agitated by the perforated plate for releasing the seeds from the straw and permitting said seeds to drop through the perforations in the plate, said pan having slots to receive guide bars mounted on the inner face of the perforated plate so that when the plate is reciprocated by a moving part of the threshing machine said plate will have a composite movement longitudinally and transversely of the said pan.

A further object of the invention is the provision of an attachment for a threshing machine and including a perforated stepped plate adapted to be oscillated on a seed pan for causing the release of the seeds from the straw whereby said seeds will pass through the perforations and will be collected in a seed pan below the oscillatable plate, the plate being so constructed that it will cause the straw to be moved away from the usual cutter bar.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1 is a plan view of the seeder constructed in accordance with the principles of my invention, Figure 2 is a vertical section taken along the line 2—2 of Figure 1, Figure 3 is a fragmentary vertical section taken along the line 3—3 of Figure 2, Figure 4 is a transverse vertical section taken along the line 4—4 of Figure 1, Figure 5 is a plan view with the perforated plate removed showing the operating mechanism for said plate.

Referring more particularly to the drawings, 10 designates a cutter bar having folded straps 11 and 12 secured to the bar, said straps at their inner ends being formed into a loop shown at 13 to provide an elongated bearing 14 for a rod 15. This rod extends longitudinally within a seed pan 16 and adjacent the edge which is associated with the cutter bar 10.

The seed pan has its inner end 17 closely associated with the cutter bar 10 and its outer end 18 of a considerably greater height than the inner end so that the oscillatable plate 19 will be tilted at an angle to the horizontal when said plate rests upon the open upper end of the seed pan. Straps 20 are secured to the outer end wall 18 and disposed in engagement with the bottom of the pan. The inner ends of the straps are bent around an outer surface of the cutter bar 10 secured thereto by means of bolts 21.

The seed plate 19 has a stepped formation and is provided with a plurality of perforations 25 through which the seeds are adapted to pass and to be collected in the pan 16. The outer edge of the plate 19 has a downturned lip 27 adapted to engage over the reinforcing bar 28 secured to the upper edge of the end wall 18 of the seed pan. The inner edge of the plate 19 is formed into a sleeve to receive the bar 15 and straps 29 extend widthwise of the plate 19 and are secured thereto in any approved manner. The inner ends of the straps are formed into collars as shown at 30 and receive the rod 15.

A bar 32 is secured to the under face of the stepped plate 19 and has an angularly disposed portion 33 received within a slot 34 of a side wall 35 of the seed pan 16. The other end of the bar 32 is bent upwardly as shown at 36 to engage over the upper edge of a side wall 37 of the pan and is then bent downwardly and upwardly to form an angular portion 38 with the free end of the angular portion secured to a depending flange 39 of the plate 19. The opposite end of the bar 32 is shown at 40 and has an angular portion which extends downwardly so that when the plate 19 is reciprocated the angular portion 40 of the bar will cause the plate 19 to rise along that edge while the angular portion 38 will cause the opposite side edge of the plate to be elevated above the upper edge of the seed pan 16.

A bell crank lever 45 is pivotally mounted at 46 on a flange 47 projecting from the inner edge of the seed pan 16. The bell crank has a long arm 48 pivotally connected at 49 to a link 50 which is in turn connected to a member 51 adapted to be actuated by the usual pitman of the threshing machine.

A U-shaped member 53 has its bridging portion pivotally connected at 54 to the short arm of the bell crank lever. The legs of the U-shaped member are provided with alined passages to receive one end of the rod 15 and said rod is secured to the legs so that when the bell crank lever is rocked the U-shaped member will be moved in a lineal manner while the rod 15 will be reciprocated. A reciprocation of the rod 15 causes oscillation of the plate 19 over the top of the seed container 16.

The operation of my device is as follows:

As the hay or stray falls upon the stepped perforated plate 19 and said plate is oscillated, the seeds will be released from the straw and hay and fall through the perforations in the plate 19 to be received by the pan 16. The stepped portions of the plate not only provide for the retaining of the seeds on the plate and preventing said seeds from moving downwardly towards the cutter bar 10 but will tend to act as shoulders for engaging the straw and hay and move said straw and hay outwardly from the cutter bar and thus prevent the hay or straw from moving onto the cutter bar.

The rocking of the lever 45 and the U-shaped member 53 causes the rod 15 not only to be reciprocated longitudinally within one end of the seed container 16 but the outward radial movement of the short arm of the bell crank lever causes the rod 15 to be moved outwardly towards the outer end 18 of the seed container 16 for a predetermined distance. This distance is limited by the length of the short arm of the bell crank lever and also by the length of the bearing surfaces 14 of the bent straps 13.

The fact that the bars or straps 29 are not only secured to the inner face of the plate 19 but are also secured to the rod 15 provides for a reinforcement of the top so that the movement is transmitted to the rod 29 rather than directly to the plate 19.

As has been previously stated, the reciprocating movement of the plate 19 causes the angular portions 40 and 38 of the bar 32 to elevate the plate 19 above the upper edge of the seed container 16 so that the depending flanges of said seed plate will clear the top of the seed container.

I claim:

1. An attachment for threshing machines comprising a seed pan, a perforated plate having stepped sections, and means for oscillating said plate over the pan, and means on the plate engageable with the top of the pan for causing said plate to be elevated above the top of the pan when said plate is oscillated, said plate being inclined at an angle to the horizontal and having its outer elevated end freely movable over the outer end of the pan.

2. An attachment for threshing machines comprising a seed pan, a perforated plate mounted on the pan, means for oscillating the plate and including a rod extending longitudinally of the pan and connected to an edge of the plate, elongated bearings for the rod, a U-shaped member having legs which are perforated to receive the rod, a bell crank pivoted on the pan and having one arm pivotally connected with the bridging portion of the U-shaped member so that when the bell crank is actuated the rod and plate will be oscillated.

JACK F. SHELTON.